(12) United States Patent
Wei et al.

(10) Patent No.: US 11,609,185 B2
(45) Date of Patent: Mar. 21, 2023

(54) PORTABLE RING-TYPE FLUORESCENCE OPTICAL SYSTEM FOR OBSERVING MICROFLUIDIC CHANNEL AND OPERATING METHOD THEREOF

(71) Applicant: NATIONAL TSING HUA UNIVERSITY, Hsinchu (TW)

(72) Inventors: Sung-Yang Wei, New Taipei (TW); Long Hsu, Hsinchu (TW); Hwan-You Chang, Hsinchu (TW); Huang-Ming Chen, Zhubei (TW); Jen-Tsan Chi, Chapel Hill, NC (US); Chung-Cheng Chou, Taoyuan (TW); Yuh-Cherng Lai, Taichung (TW); Hung-Yu Yeh, Xinfeng Township (TW); Ting-Chou Wei, Taoyuan (TW); Yun-Ting Yao, Taipei (TW); Cheng-Hsien Liu, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 3 days.

(21) Appl. No.: 17/397,299

(22) Filed: Aug. 9, 2021

(65) Prior Publication Data

US 2022/0364995 A1 Nov. 17, 2022

(30) Foreign Application Priority Data

May 14, 2021 (TW) .................. 110117591

(51) Int. Cl.
*G01N 21/64* (2006.01)
*G02B 21/16* (2006.01)

(52) U.S. Cl.
CPC ..... *G01N 21/6486* (2013.01); *G01N 21/6447* (2013.01); *G01N 21/6458* (2013.01); *G01N 2021/6463* (2013.01); *G02B 21/16* (2013.01)

(58) Field of Classification Search
CPC ........... G01N 21/6486; G01N 21/6447; G01N 21/6458; G01N 2021/6463; G02B 21/16
See application file for complete search history.

(56) References Cited

U.S. PATENT DOCUMENTS

| 5,062,697 A | * | 11/1991 | Mitchell | G02B 21/0008 359/398 |
| 6,139,831 A | * | 10/2000 | Shivashankar | B01J 19/0046 118/623 |

(Continued)

FOREIGN PATENT DOCUMENTS

| WO | WO-2019103909 A1 | * | 5/2019 | |
| WO | WO 2021/050023 A1 | | 3/2021 | |
| WO | WO-2021050023 A1 | * | 3/2021 | ............ C12M 23/54 |

*Primary Examiner* — David P Porta
*Assistant Examiner* — Djura Malevic
(74) *Attorney, Agent, or Firm* — Birch, Stewart, Kolasch & Birch, LLP (57) ABSTRACT

A portable ring-type fluorescence optical system for observing microfluidic channel and an operating method thereof are disclosed. The portable ring-type fluorescence optical system includes a photographic chip, a first polarizer, an objective lens, a ring-type fluorescent light source, a biological sample on a microfluidic chip, a second polarizer and a bottom illumination light source arranged in order from top to bottom. The ring-type fluorescent light source is used to generate a ring-type fluorescent light to the biological sample on the microfluidic chip. The objective lens is used to magnify a fluorescent image of the biological sample on the microfluidic chip to focus on the photographic chip. The first polarizer disposed under the photographic chip and the second polarizer disposed under the biological sample form a non-zero angle to each other to block reflected lights that the biological sample reflects the lights emitted by the bottom illumination light source.

6 Claims, 6 Drawing Sheets

(56) References Cited

U.S. PATENT DOCUMENTS

| | | | |
|---|---|---|---|
| 8,184,366 B2* | 5/2012 | Liang | G02B 21/06 359/368 |
| 8,947,656 B2* | 2/2015 | Cunningham | G01J 3/0264 356/300 |
| 9,185,200 B2* | 11/2015 | Cunningham | G01J 3/44 |
| 9,360,366 B1* | 6/2016 | Tran | G01J 3/04 |
| 9,448,178 B2* | 9/2016 | Graeber | C12Q 1/485 |
| 9,497,379 B2* | 11/2016 | Ou | G02B 27/1066 |
| 9,658,152 B2* | 5/2017 | Zimmerle | G02B 21/0008 |
| 9,835,842 B2* | 12/2017 | Fan | G02B 21/362 |
| 9,993,149 B2* | 6/2018 | Chung | G02B 26/0833 |
| 10,060,937 B2* | 8/2018 | McDevitt | G01N 35/1002 |
| 10,101,278 B2* | 10/2018 | Blair | G01N 21/645 |
| 10,162,161 B2* | 12/2018 | Horstmeyer | G02B 21/361 |
| 10,466,466 B2* | 11/2019 | Cheng | H04N 5/2257 |
| 10,495,863 B2* | 12/2019 | Lin | G02B 21/0008 |
| 10,718,934 B2* | 7/2020 | Horstmeyer | G02B 21/0092 |
| 10,775,600 B2* | 9/2020 | Mathis, II | G02B 21/0088 |
| 11,009,464 B2* | 5/2021 | Hu | G01N 15/0255 |
| 11,061,019 B2* | 7/2021 | Chen | G01N 33/52 |
| 11,150,131 B2* | 10/2021 | Cunningham | G01N 21/645 |
| 11,199,498 B2* | 12/2021 | Blair | G01J 3/4406 |
| 2001/0010591 A1* | 8/2001 | Kusaka | G02B 21/14 359/371 |
| 2002/0044347 A1* | 4/2002 | Steenblik | G02B 27/0012 359/383 |
| 2002/0159162 A1* | 10/2002 | Ramm | G02B 13/22 359/663 |
| 2005/0196857 A1* | 9/2005 | Lee | G02B 21/34 359/398 |
| 2008/0132422 A1* | 6/2008 | Bohlen | G01N 33/5438 506/10 |
| 2011/0268434 A1* | 11/2011 | Knoedgen | G03B 3/10 396/439 |
| 2012/0058504 A1* | 3/2012 | Li | B01L 3/502761 435/283.1 |
| 2012/0157160 A1* | 6/2012 | Ozcan | B01L 3/502715 455/556.1 |
| 2013/0016963 A1* | 1/2013 | Miller | G02B 21/362 396/428 |
| 2013/0244257 A1* | 9/2013 | Graeber | G01N 33/54366 435/287.2 |
| 2013/0286474 A1* | 10/2013 | Kitahara | G02B 21/248 359/381 |
| 2014/0120982 A1* | 5/2014 | Fletcher | G02B 21/26 455/556.1 |
| 2014/0193839 A1* | 7/2014 | Cunningham | G01N 21/6428 435/7.92 |
| 2015/0004717 A1* | 1/2015 | McDevitt | G01N 35/1002 422/63 |
| 2015/0104860 A1* | 4/2015 | Cunningham | G01N 21/7746 435/287.2 |
| 2015/0322514 A1* | 11/2015 | Ginsburg | A61K 31/60 435/6.12 |
| 2016/0004057 A1* | 1/2016 | Lin | G02B 21/0008 359/386 |
| 2017/0160534 A1* | 6/2017 | Fan | G02B 21/361 |
| 2017/0336619 A1* | 11/2017 | Cheng | G02B 21/362 |
| 2019/0204576 A1* | 7/2019 | Mathis, II | G02B 21/025 |
| 2020/0171501 A1* | 6/2020 | McEwen | B01L 7/52 |

* cited by examiner

PORTABLE RING-TYPE FLUORESCENCE OPTICAL SYSTEM FOR OBSERVING MICROFLUIDIC CHANNEL AND OPERATING METHOD THEREOF

BACKGROUND OF THE INVENTION

1. Field of the Invention

The invention relates to a fluorescence optical system; in particular, to a portable ring-type fluorescence optical system for observing microfluidic channel and an operating method thereof.

2. Description of the Prior Art

In general, in a conventional fluorescence optical system (such as a fluorescent microscope, but not limited to this), an element such as spectroscope is usually required to separate the illuminating light from the fluorescent light emitted by the sample.

However, the configuration of the component such as spectroscope makes it difficult to reduce the volume of the conventional fluorescence optical system (such as the fluorescent microscope), so it is inconvenient for the user to operate it to observe the microfluidic channel system having multiple functions and applied to various biological samples and it is also difficult to carry. Therefore, it needs to be improved urgently.

SUMMARY OF THE INVENTION

Therefore, the invention provides a portable ring-type fluorescence optical system for observing microfluidic channel and an operating method thereof to effectively solve the above-mentioned problems in the prior art.

A scope of the invention is to provide a ring-type fluorescence optical system, which is small in size and convenient to carry, and can be finely adjusted to facilitate observation of microfluidic chips with different sizes and functions and suitable for various biological samples. It can replace the conventional huge fluorescence optical system which is need to be equipped with a spectroscope or dual objective lens.

An embodiment of the invention is a portable ring-type fluorescence optical system for observing microfluidic channel. The portable ring-type fluorescence optical system for observing microfluidic channel includes a photographic chip, a first polarizer, an objective lens, a ring-type fluorescent light source, a biological sample on a microfluidic chip, a second polarizer and a bottom illumination light source arranged in order from top to bottom. The ring-type fluorescent light source is configured to generate a ring-type fluorescent light to the biological sample on the microfluidic chip. The objective lens is configured to magnify a fluorescent image of the biological sample on the microfluidic chip to focus on the photographic chip. The first polarizer disposed under the photographic chip and the second polarizer disposed under the biological sample form a non-zero angle to each other to block reflected lights that the biological sample reflects illumination lights emitted by the bottom illumination light source.

In one embodiment, the biological sample on the microfluidic chip is placed in a replaceable microfluidic channel placement component. The portable ring-type fluorescence optical system for observing microfluidic channel also includes a specific fine-tuning rod component, which is disposed above the photographic chip and beside the replaceable microfluidic channel placement component and connected with the replaceable microfluidic channel placement component for finely moving the replaceable microfluidic channel placement component up and down to change a distance from the biological sample on the microfluidic chip to the objective lens, so that the fluorescent image of the biological sample can be clearly focused on the photographic chip.

In one embodiment, the specific fine-tuning rod component includes an adjusting wheel and an L-shaped fine-tuning rod connected to each other. The adjustment wheel is disposed above the photographic chip. The L-shaped fine-tuning rod is disposed beside the replaceable microfluidic channel placement component and connected with the replaceable microfluidic channel placement component. When the adjusting wheel is rotated, the adjusting wheel pushes the L-shaped fine-tuning rod to finely move the replaceable microfluidic channel placement component up and down to fine-tune the distance from the biological sample on the microfluidic chip to the objective lens, so that the fluorescent image of the biological sample can be clearly focused on the photographic chip.

In one embodiment, the portable ring-type fluorescence optical system for observing microfluidic channel further includes a specific ring-type gear component, which is connected to the objective lens for finely moving the objective lens up and down to fine-tune the distance from the objective lens to the biological sample, so that the fluorescent image of the biological sample can be clearly focused on the photographic chip.

In one embodiment, the specific ring-type gear component includes a ring-type gear, an adjusting wheel and a lever. When the adjusting wheel is rotated, the adjusting wheel rotates the ring-type gear and the objective lens is acted by the lever and does not rotate with the ring-type gear, causing a relative distance between the ring-type gear and the objective lens to change for finely moving the objective lens up and down to fine-tune the distance from the objective lens to the biological sample, so that the fluorescent image of the biological sample can be clearly focused on the photographic chip.

Another embodiment of the invention is a portable ring-type fluorescence optical system operating method for observing microfluidic channel. The portable ring-type fluorescence optical system for observing microfluidic channel includes a photographic chip, a first polarizer, an objective lens, a ring-type fluorescent light source, a biological sample on a microfluidic chip, a second polarizer and a bottom illumination light source arranged in order from top to bottom. The portable ring-type fluorescence optical system operating method includes steps of: (a) generating a ring-type fluorescent light to the biological sample on the microfluidic chip through the ring-type fluorescent light source; (b) magnifying a fluorescent image of the biological sample on the microfluidic chip through the objective lens to focus on the photographic chip; and (c) controlling the first polarizer disposed under the photographic chip and the second polarizer disposed under the biological sample to form a non-zero angle to each other to block reflected lights that the biological sample reflects illumination lights emitted by the bottom illumination light source.

In one embodiment, the biological sample on the microfluidic chip is placed in a replaceable microfluidic channel placement component. The ring-type fluorescence optical system for portable observation of micro-channels also includes a specific fine-tuning rod component, which is disposed above the photographic chip and beside the replaceable microfluidic channel placement component and connected to the replaceable microfluidic channel placement component. The operation method also includes: changing the distance between the biological sample on the microfluidic chip and the objective lens by finely moving the replaceable microfluidic channel placement component up and down through the specific fine-tuning rod component, so that the fluorescent image of the biological sample can be clearly focused on the photographic chip.

In one embodiment, the specific fine-tuning rod component includes an adjusting wheel and an L-shaped fine-tuning rod connected to each other. The adjustment wheel is disposed above the photographic chip. The L-shaped fine adjustment rod is disposed beside the replaceable microfluidic channel placement component and connected with the replaceable microfluidic channel placement component. The operation method also includes: when the adjusting wheel is rotated, the adjusting wheel pushes the L-shaped fine-tuning rod to finely move the replaceable microfluidic channel placement component up and down to fine-tune the distance from the biological sample on the microfluidic chip to the objective lens, so that the biological fluorescent image of the sample can be clearly focused on the photographic chip.

In one embodiment, the portable ring-type fluorescence optical system for observing microfluidic channel further includes a specific ring-type gear component, which is connected to the objective lens. The operation method further includes: finely moving the objective lens up and down to fine-tune the distance from the objective lens to the biological sample through the specific ring-type gear component, so that the fluorescent image of the biological sample can be clearly focused on the photographic chip.

In one embodiment, the specific ring-type gear component includes a ring-type gear, an adjusting wheel and a lever. The operation method further includes: when the adjusting wheel is rotated, the adjusting wheel rotates the ring-type gear and the objective lens is acted by the lever and does not rotate with the ring-type gear, causing a relative distance between the ring-type gear and the objective lens to change for finely moving the objective lens up and down to fine-tune the distance from the objective lens to the biological sample, so that the fluorescent image of the biological sample can be clearly focused on the photographic chip.

Compared with the prior art, the portable ring-type fluorescence optical system for observing microfluidic channel and its operating method of the invention can greatly reduce the volume of the fluorescence optical system and finely fine-tune the distance between the objective lens and the biological sample on the microfluidic chip through the designs of "specific fine-tuning rod component/specific ring-type gear component", "ring-type fluorescent light source with reduced volume" and "two polarizers, disposed under the photographic chip and under the biological sample on the microfluidic chip respectively, forming a non-zero angle with each other", the precise fluorescent images of the biological samples on the microfluidic chip can be obtained more efficiently, so it can be easily carried and can be suitable for processing microfluidic chips with different sizes and functions for various biological samples at the same time through "the replaceable microfluidic channel placement component".

The advantage and spirit of the invention may be understood by the following detailed descriptions together with the appended drawings.

DETAILED DESCRIPTION OF THE INVENTION

Exemplary embodiments of the invention are referenced in detail now, and examples of the exemplary embodiments are illustrated in the drawings. Further, the same or similar reference numerals of the components/components in the drawings and the detailed description of the invention are used on behalf of the same or similar parts.

An specific embodiment of the invention is a portable ring-type fluorescence optical system for observing microfluidic channel, which is smaller in volume than conventional fluorescence optical systems and is more convenient for users to carry, and can be finely fine-tune the distance between the objective lens and the biological sample to facilitate observation of the microfluidic system with multiple functions and applicable to various biological samples, so it can replace the conventional huge fluorescence optical system equipped with spectroscope or double objective lens and other components.

It should be noted that the portable ring-type fluorescence optical system for observing microfluidic channel of the invention magnifies the fluorescent image of the biological sample on the microfluidic chip through "objective lens", and combines "ring-type fluorescent light source" and "two polarizers with a non-zero angle between each other placed under the photographic chip and the biological sample respectively" to block the reflected lights that the biological sample reflects the illumination lights emitted by the bottom illumination light, and maintains high-precision focus imaging to obtain clear fluorescent images of biological samples through "specific fine-tuning rod component" or "specific ring-type gear components".

Next, a detailed description will be provided through the following two specific embodiments respectively.

Figure 1:
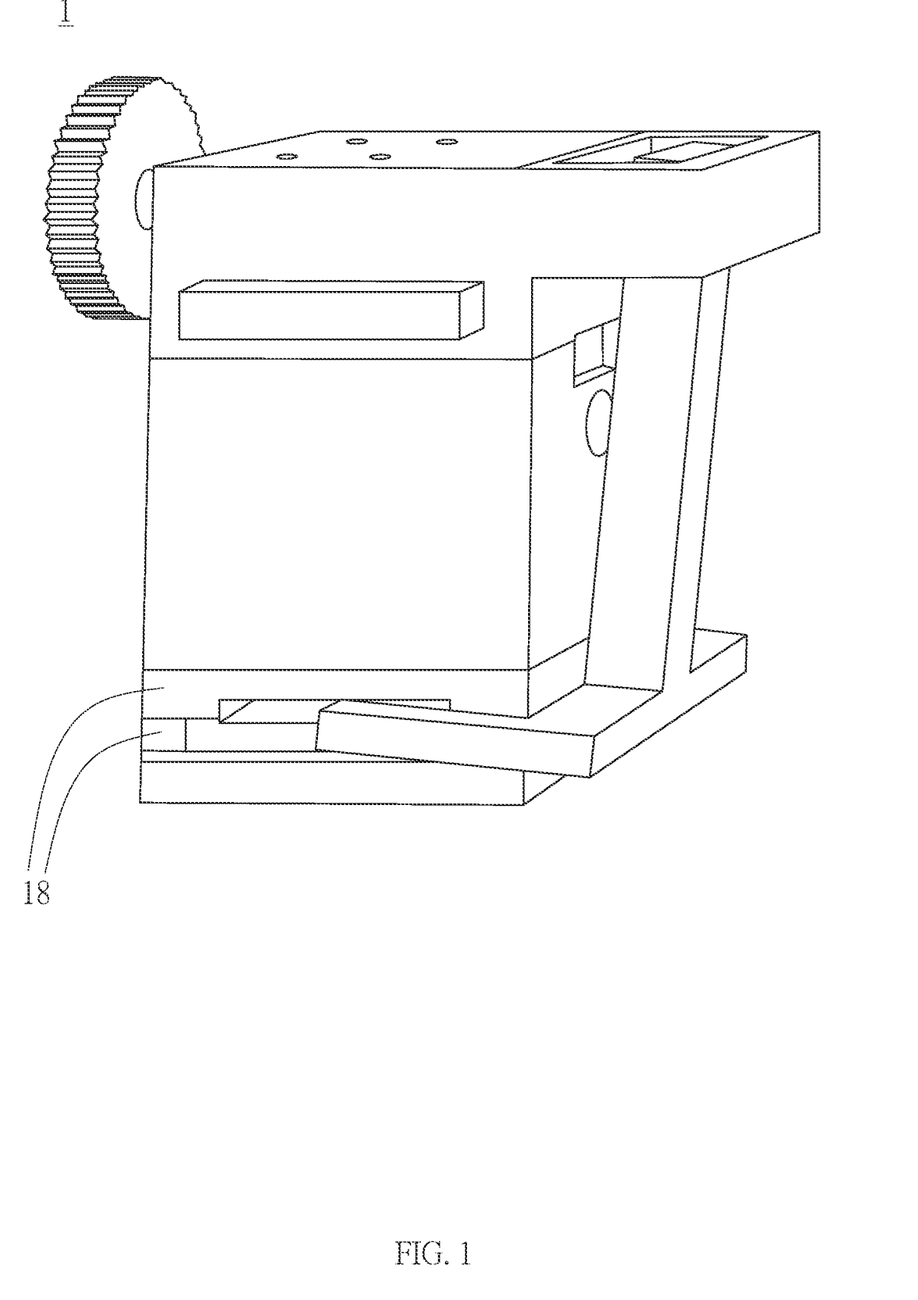
FIG. 1 illustrates a schematic diagram of the portable ring-type fluorescence optical system for observing microfluidic channel in a preferred embodiment of the invention.
Figure 2:
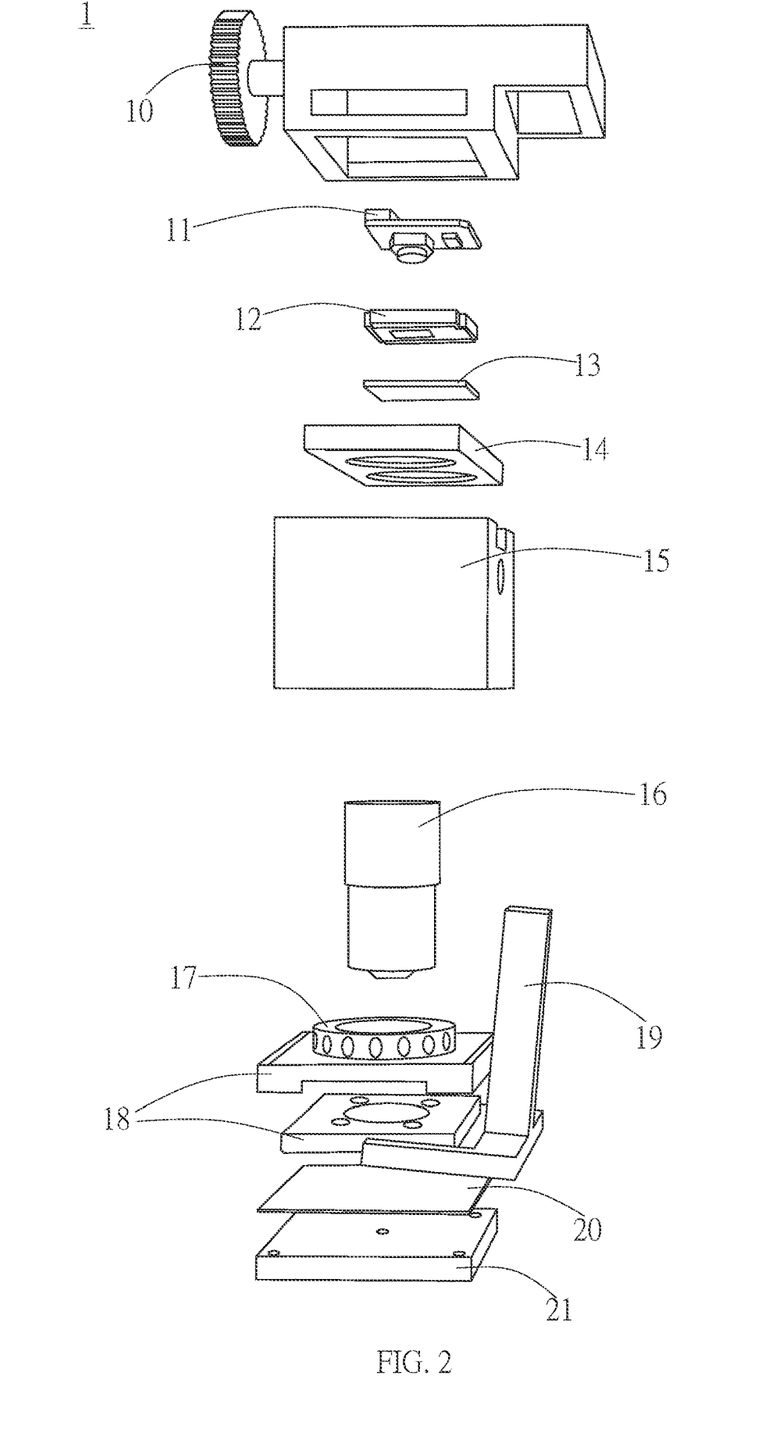
FIG. 2 illustrates an exploded view of the portable ring-type fluorescence optical system for observing microfluidic channel in FIG. 1.

Please refer to FIG. 1 and FIG. 2. FIG. 1 illustrates a schematic diagram of the portable ring-type fluorescence optical system for observing microfluidic channel in a preferred embodiment of the invention. FIG. 2 illustrates an exploded view of the portable ring-type fluorescence optical system for observing microfluidic channel in FIG. 1.

As shown in FIG. 1, the portable ring-type fluorescence optical system 1 for observing microfluidic channel for observing micro-channels of the invention can be a portable ring-type fluorescent microscope for observing micro-channels, which can be equipped with a replaceable microfluidic channel placement component 18 used to arbitrarily replace and place various microfluidic chips with different sizes and functions according to practical needs, so that users can observe different biological samples (such as cells or sliced sample of tissues) on different microfluidic chips. Since the portable ring-type fluorescence optical system 1 for observing microfluidic channel of the invention does not need to be equipped with components such as a spectroscope or double objective lens, its volume can be greatly reduced and is significantly smaller than a conventional fluorescence optical system to facilitate the user to carry.

As shown in FIG. 2, the portable ring-type fluorescence optical system 1 for observing microfluidic channel includes an adjustment wheel 10, a photographic chip 11, a mask 12, a first polarizer 13, a filter 14, an objective lens placement place 15, an objective Lens 16, a ring-type fluorescent light source 17, a replaceable microfluidic channel placement component 18, a L-shaped fine-tuning rod 19, a second polarizer 20 and a bottom illumination light source 21 arranged in order from top to bottom.

The ring-type fluorescent light source 17 is used to generate ring-type fluorescent light to a biological sample on the microfluidic chip placed by the replaceable microfluidic channel placement component 18. The objective lens 16 is used to magnify a fluorescent image of the biological sample on the microfluidic chip to focus on the photographic chip 11. The first polarizer 13 disposed under the photographic chip 11 and the second polarizer 20 disposed under the replaceable microfluidic channel placement component 18 form a non-zero angle with each other (this angle is preferably 90 degrees, that is, the first polarizer 13 and the second polarizer 20 are perpendicular to each other, but not limited to this) to block the reflected lights that the biological sample on the microfluidic chip reflects the illumination lights emitted by the bottom illumination light source 21.

It should be noted that the so-called "specific fine-tuning rod component" in this embodiment includes an adjusting wheel 10 and an L-shaped fine-tuning rod 19 connected to each other. The adjusting wheel 10 is disposed above the photographic wafer 11. The L-shaped fine-tuning rod 19 is disposed beside the replaceable microfluidic channel placement component 18 and connected to the replaceable microfluidic channel placement component 18. When the adjusting wheel 10 is rotated, the adjusting wheel 10 will push the L-shaped fine-tuning rod 19 to finely move the replaceable microfluidic channel placement component 18 up and down to fine-tune the distance from the biological sample on the microfluidic chip placed on the replaceable microfluidic channel placement component 18 to the objective lens 16, so that the fluorescent image of the biological sample on the microfluidic chip can be clearly focused on the photographic chip 11, and the clear fluorescent image of the biological sample can be obtained.

Figure 3:
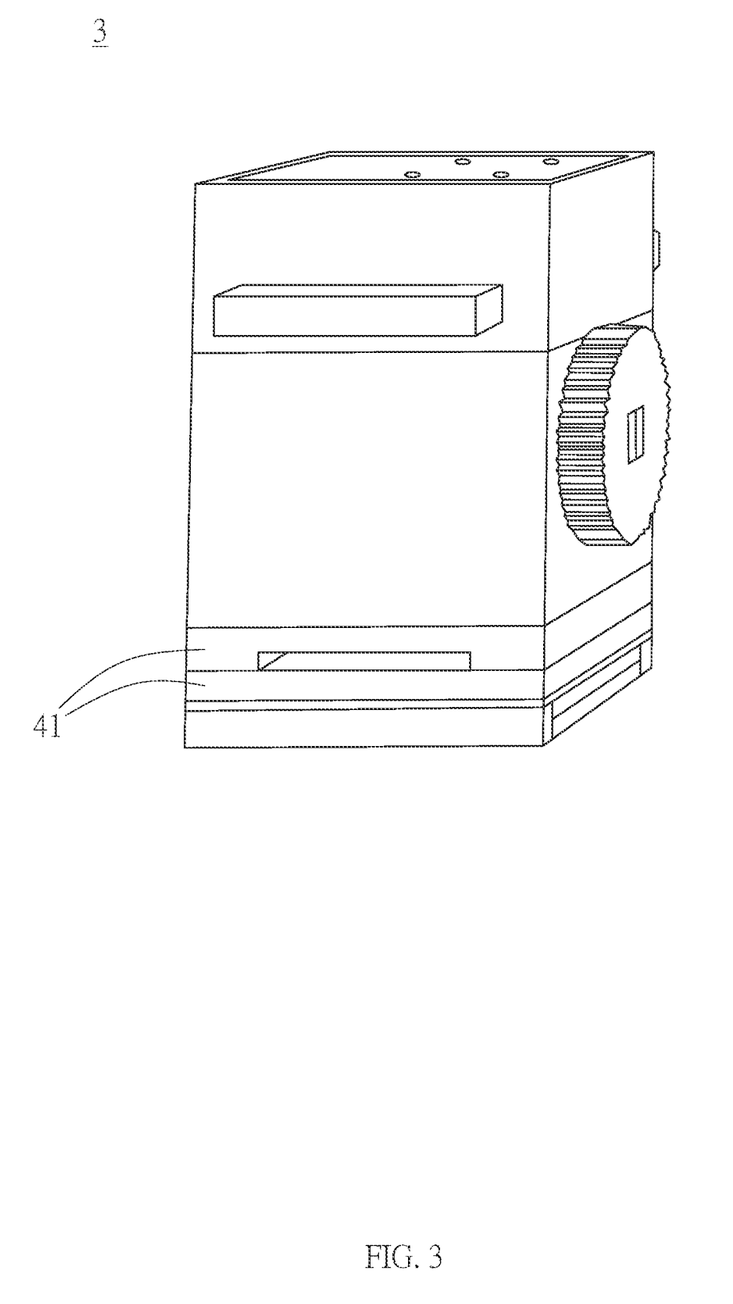
FIG. 3 illustrates a schematic diagram of the portable ring-type fluorescence optical system for observing microfluidic channel in another preferred embodiment of the invention.
Figure 4:
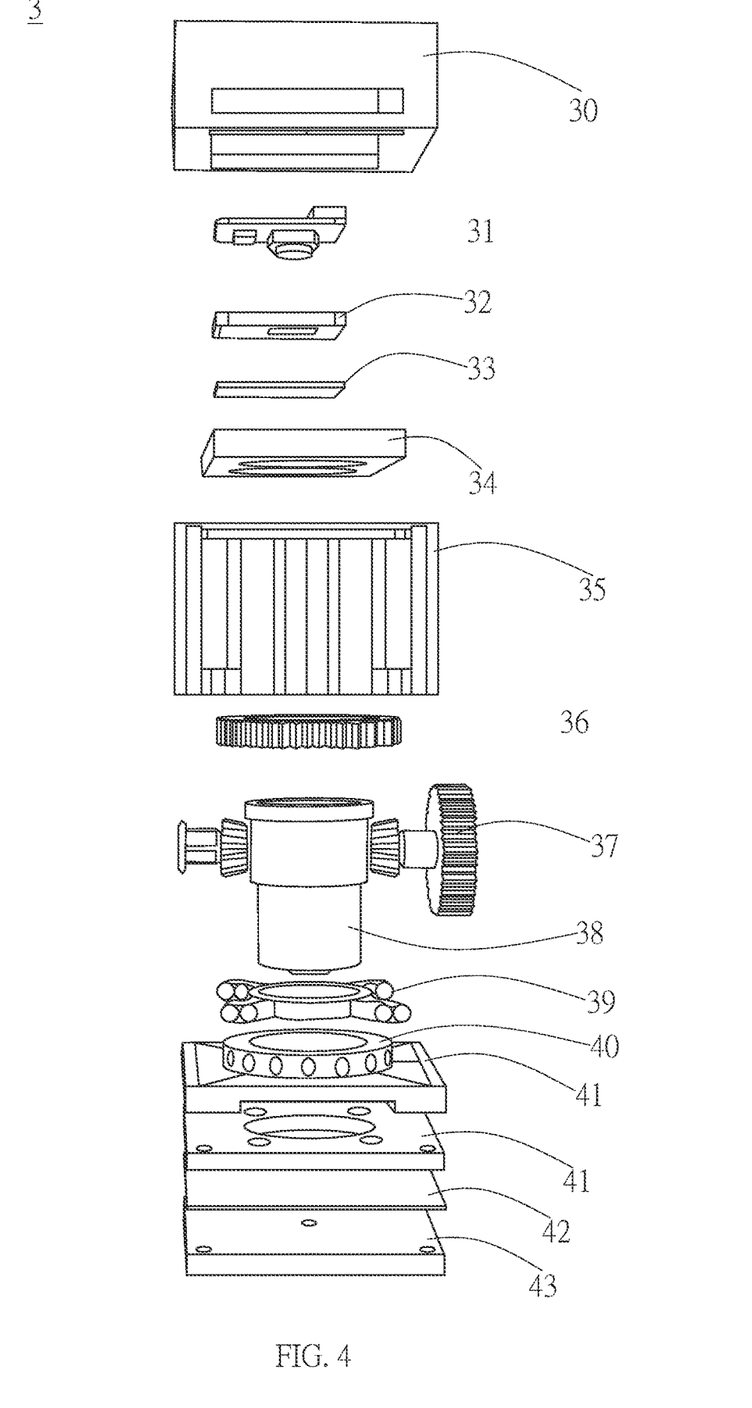
FIG. 4 illustrates an exploded view of the portable ring-type fluorescence optical system for observing microfluidic channel in FIG. 3.

Please refer to FIG. 3 and FIG. 4. FIG. 3 illustrates a schematic diagram of the portable ring-type fluorescence optical system for observing microfluidic channel in another preferred embodiment of the invention. FIG. 4 illustrates an exploded view of the portable ring-type fluorescence optical system for observing microfluidic channel in FIG. 3.

As shown in FIG. 3, the portable ring-type fluorescence optical system 3 for observing microfluidic channel of the invention can be a portable ring-type fluorescent microscope for observing micro-channels, which can be equipped with a replaceable microfluidic channel placement component 41 used to arbitrarily replace and place various microfluidic chips with different sizes and functions according to practical needs, so that users can observe different biological samples (such as cells or sliced sample of tissues) on different microfluidic chips. Since the portable ring-type fluorescence optical system 3 for observing micro-channels of the invention does not need to be equipped with components such as spectroscopes or double objective lenses, its volume can be greatly reduced and is significantly smaller than the conventional fluorescence optical system to facilitate the user to carry.

As shown in FIG. 4, the portable ring-type fluorescence optical system 3 for observing micro-channels includes an upper cover 30, a photographic chip 31, a mask 32, a first polarizer 33, a filter 34, an objective lens placement place 35, a ring-type gear 36, an adjusting wheel 37, an objective lens 38, a lever 39, a ring-type fluorescent light source 40, a replaceable microfluidic channel placement component 41, a second polarizer 42 and a bottom illumination light source 43.

The ring-type fluorescent light source 40 is used to generate a ring-type fluorescent light to a biological sample placed on the microfluidic chip of the replaceable microfluidic channel placement component 41. The objective lens 38 is used to magnify a fluorescent image of the biological sample on the microfluidic chip to focus on the photographic chip 31. The first polarizer 33 disposed under the photographic chip 31 and the second polarizer 42 disposed under the replaceable microfluidic channel placement component 41 form a non-zero angle with each other (this angle is preferably 90 degrees, but not limited to this) to block reflected lights that the biological sample on the microfluidic chip reflects illumination lights emitted by the bottom illumination light source 43.

It should be noted that the so-called "specific ring-type gear component" in this embodiment includes a ring-type gear 36, an adjusting wheel 37 and a lever 39. The lever 39 and the objective lens 38 are connected. When the adjusting wheel 37 is rotated, the adjusting wheel 37 will rotate the ring-type gear 36 and the objective lens 38 will not rotate with the ring-type gear 36 under the action of the lever 39 combined with the objective lens placement place 35 to change a relative distance between the ring-type gear 36 and the objective lens 38 for finely moving the objective lens 38 up and down to fine tune the distance from the objective lens 38 to the biological sample on the microfluidic chip, so that the fluorescent image of the biological sample on the microfluidic chip can be clearly focused on the photographic chip 31, and the clear fluorescent image of the biological sample can be obtained.

In practical applications, for example, a light guide system such as liquid crystals can be used to condense lights to generate the ring-type light source used in the invention. The light wavelength range of the lights can be adjusted through the liquid crystals, such as a wide range of visible light wavelength from violet light to red light, but not limited to this. In addition, different types of incident light sources (such as side-entry light sources or planar light sources) can be used to generate ring-type light sources, and the lights can also be directly polarized, but not limited to this.

Figure 5:
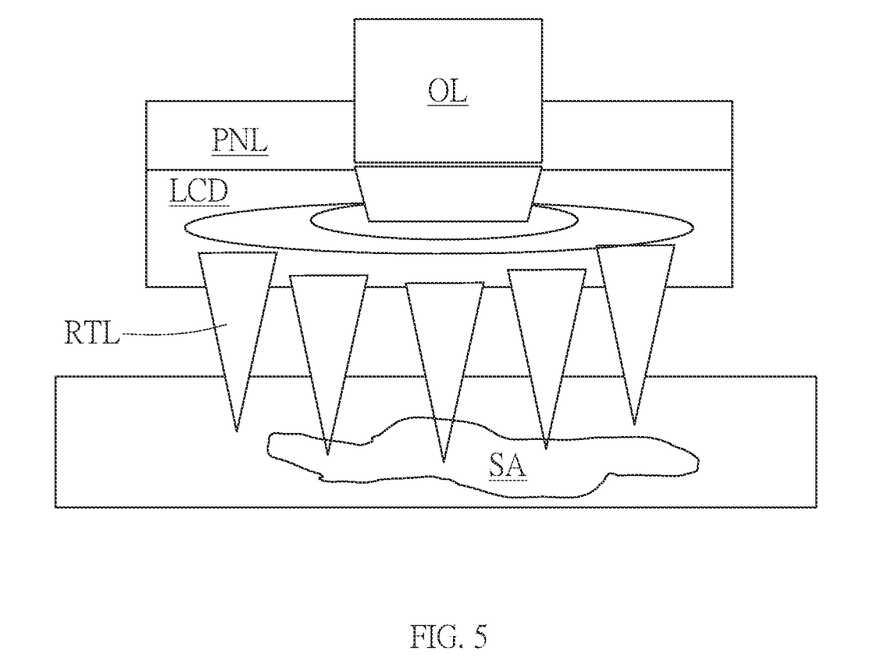
FIG. 5 and FIG. 6 illustrate different embodiments of forming the ring-type light source provided to the biological sample respectively.
Figure 6:
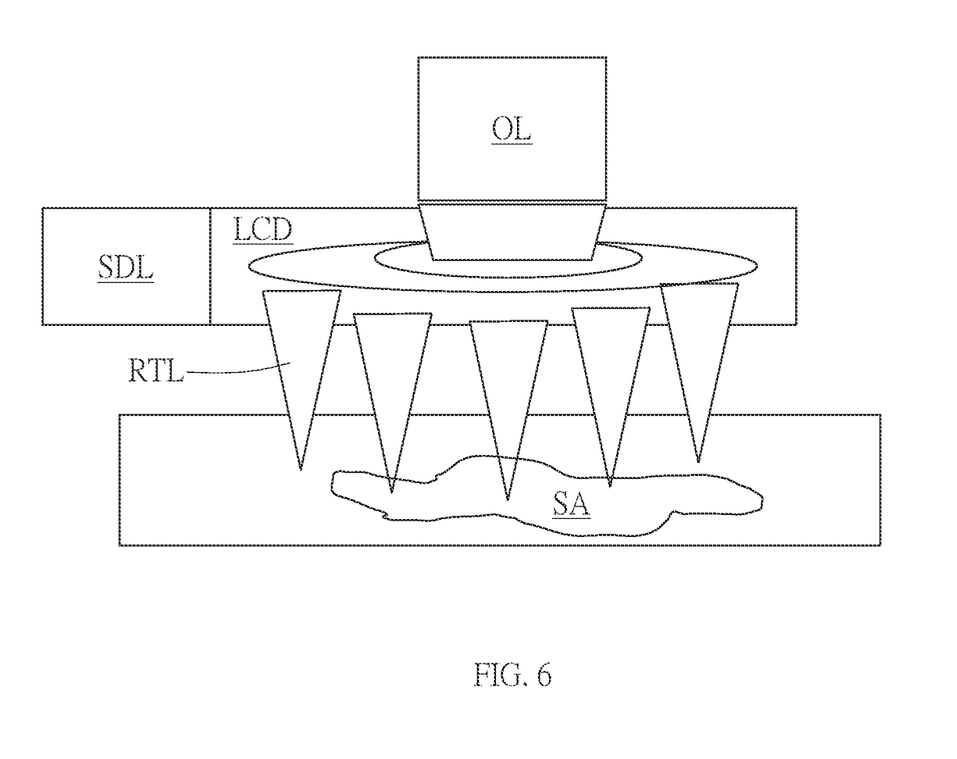

For example, please refer to FIG. 5 and FIG. 6. FIG. 5 and FIG. 6 illustrate different embodiments of generating the ring-type light source provided to the biological sample respectively. As shown in FIG. 5, the lights emitted by the planar light source PNL are transmitted through the liquid crystal LCD to generate the ring-type light source RTL to emit lights to the biological sample SA. As shown in FIG. 6, the lights emitted by the side input light source SDL are transmitted through the liquid crystal LCD to generate the ring-type light source RTL to emit lights to the biological sample SA.

Another embodiment of the invention is a portable ring-type fluorescence optical system operating method for observing microfluidic channel. In this embodiment, the portable ring-type fluorescence optical system for observing microfluidic channel includes a photographic chip, a first polarizer, an objective lens, a ring-type fluorescent light source, a biological sample on a microfluidic chip, a second polarizer and a bottom illumination light source arranged in order from top to bottom, but not limited to this.

Figure 7:
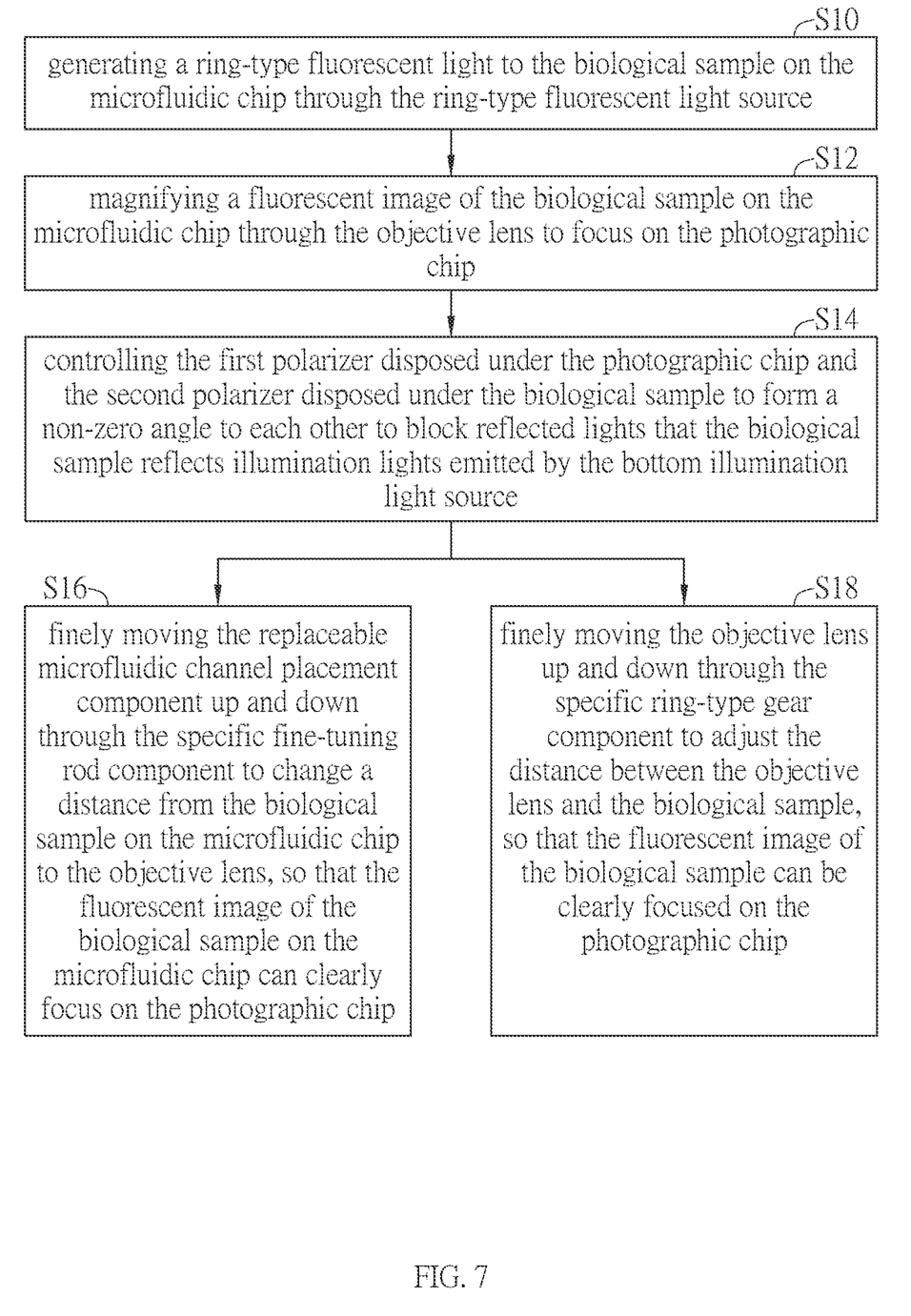
FIG. 7 illustrates a flowchart of the method of operating the portable ring-type fluorescence optical system for observing microfluidic channel in another preferred embodiment of the invention.

As shown in FIG. 7, the operating method includes the following steps of:

Step S10: generating a ring-type fluorescent light to the biological sample on the microfluidic chip through the ring-type fluorescent light source;

Step S12: magnifying a fluorescent image of the biological sample on the microfluidic chip through the objective lens to focus on the photographic chip; and Step S14: controlling the first polarizer disposed under the photographic chip and the second polarizer disposed under the biological sample to form a non-zero angle (for example, an angle of 90 degrees) to each other to block reflected lights that the biological sample reflects illumination lights emitted by the bottom illumination light source.

In one embodiment, the biological sample on the microfluidic chip is placed in a replaceable microfluidic channel placement component. The portable ring-type fluorescence optical system operating method for observing microfluidic channel also includes a specific fine-tuning rod component, which is disposed above the photographic chip and beside the replaceable microfluidic channel placement component and connected to the replaceable microfluidic channel placement component. The operating method can further include the following steps:

Step S16: finely moving the replaceable microfluidic channel placement component up and down through the specific fine-tuning rod component to change a distance from the biological sample on the microfluidic chip to the objective lens, so that the fluorescent image of the biological sample on the microfluidic chip can clearly focus on the photographic chip.

In practical applications, the specific fine-tuning rod component can include an adjusting wheel and a L-shaped fine-tuning rod connected to each other, but not limited to this. The adjustment wheel is disposed above the photographic chip. The L-shaped fine-tuning rod is disposed beside the replaceable microfluidic channel placement component and connected with the replaceable microfluidic channel placement component. When the adjusting wheel is rotated, the adjusting wheel pushes the L-shaped fine-tuning rod to finely move the replaceable microfluidic channel placement component up and down to fine-tune the distance from the biological sample on the microfluidic chip to the objective lens, so that the fluorescent image of the biological sample on the microfluidic chip can be clearly focused on the photographic chip, but not limited to this.

In another embodiment, the portable ring-type fluorescence optical system operating method for observing microfluidic channel further includes a specific ring-type gear component, which is connected to the objective lens. The operating method can further include the following steps:

Step S18: finely moving the objective lens up and down through the specific ring-type gear component to adjust the distance between the objective lens and the biological sample, so that the fluorescent image of the biological sample can be clearly focused on the photographic chip.

In practical applications, the specific ring-type gear component can include a ring-type gear, an adjusting wheel and a lever, but not limited to this. When the adjusting wheel is rotated, the adjusting wheel rotates the ring-type gear and the objective lens is acted by the lever and does not rotate with the ring-type gear to change a relative distance between the ring-type gear and the objective lens for finely moving the objective lens up and down to fine-tune the distance from the objective lens to the biological sample, so that the fluorescent image of the biological sample can be clearly focused on the photographic chip, but not limited to this.

Compared with the prior art, the portable ring-type fluorescence optical system for observing microfluidic channel and its operating method of the invention can greatly reduce the volume of the fluorescence optical system and finely fine-tune the distance between the objective lens and the biological sample on the microfluidic chip through the designs of "specific fine-tuning rod component/specific ring-type gear component", "ring-type fluorescent light source with reduced volume" and "two polarizers, disposed under the photographic chip and under the biological sample on the microfluidic chip respectively, forming a non-zero angle with each other", the precise fluorescent images of the biological samples on the microfluidic chip can be obtained more efficiently, so it can be easily carried and can be suitable for processing microfluidic chips with different sizes and functions for various biological samples at the same time through "the replaceable microfluidic channel placement component".

What is claimed is:

1. A portable ring-type fluorescence optical system for observing microfluidic channel, comprising:

a photographic chip, a first polarizer, an objective lens, a ring-type fluorescent light source, a biological sample on a microfluidic chip, a second polarizer and a bottom illumination light source arranged in order from top to bottom;

wherein the ring-type fluorescent light source is configured to generate a ring-type fluorescent light to the biological sample on the microfluidic chip; the objective lens is configured to magnify a fluorescent image of the biological sample on the microfluidic chip to focus on the photographic chip; the first polarizer disposed under the photographic chip and the second polarizer disposed under the biological sample are configured to form a non-zero angle to each other to block reflected lights that the biological sample reflects illumination lights emitted by the bottom illumination light source; the ring-type fluorescent light source disposed above the biological sample on the microfluidic chip is different from the bottom illumination light source disposed under the biological sample on the microfluidic chip, and the portable ring-type fluorescence optical system for observing microfluidic channel fine-tunes a distance between the biological sample on the microfluidic chip and the objective lens, so that the fluorescent image of the biological sample on the microfluidic chip can be clearly focused on the photographic chip; the portable ring-type fluorescence optical system for observing microfluidic channel further comprises a specific fine-tuning rod component, which is disposed above the photographic chip and beside to a replaceable microfluidic channel placement component and connected to the replaceable microfluidic channel placement component for finely moving the replaceable microfluidic channel placement component up and down to change the distance from the biological sample on the microfluidic chip to the objective lens, so that the fluorescent image of the biological sample on the microfluidic chip can be clearly focused on the photographic chip;

wherein the specific fine-tuning rod component comprises an adjusting wheel and a L-shaped fine-tuning rod connected to each other; the adjusting wheel is disposed above the photographic chip; the L-shaped fine-tuning rod is disposed beside the replaceable microfluidic channel placement component and connected with the replaceable microfluidic channel placement component; when the adjusting wheel is rotated, the rotated adjustment wheel pushes an end of a long side of the L-shaped fine-tuning rod to generate a long-side displacement, and a corner of the L-shaped fine-tuning rod is used as a fulcrum to convert the long-side displacement of the L-shaped fine-tuning rod into a short-side displacement to vertically push the replaceable microfluidic channel placement component to finely move up and down to fine-tune the distance from the biological sample on the microfluidic chip to the objective lens, so that the fluorescent image of the biological sample can be clearly focused on the photographic chip.

2. The portable ring-type fluorescence optical system for observing microfluidic channel of claim 1, further comprising:

a specific ring-type gear component, which is connected to the objective lens for finely moving the objective lens up and down to fine-tune the distance from the objective lens to the biological sample, so that the fluorescent image of the biological sample can be clearly focused on the photographic chip.

3. The portable ring-type fluorescence optical system for observing microfluidic channel of claim 2, wherein the specific ring-type gear component comprises a ring-type gear, an adjusting wheel and a lever; when the adjusting wheel is rotated, the adjusting wheel rotates the ring-type gear and the objective lens is acted by the lever and does not rotate with the ring-type gear, causing a relative distance between the ring-type gear and the objective lens to change for finely moving the objective lens up and down to fine-tune the distance from the objective lens to the biological sample, so that the fluorescent image of the biological sample can be clearly focused on the photographic chip.

4. A method of operating a portable ring-type fluorescence optical system for observing microfluidic channel, the portable ring-type fluorescence optical system for observing microfluidic channel comprising a photographic chip, a first polarizer, an objective lens, a ring-type fluorescent light source, a biological sample on a microfluidic chip, a second polarizer and a bottom illumination light source arranged in order from top to bottom, the method comprising steps of:

(a) generating a ring-type fluorescent light to the biological sample on the microfluidic chip through the ring-type fluorescent light source;

(b) magnifying a fluorescent image of the biological sample on the microfluidic chip through the objective lens to focus on the photographic chip; and (c) controlling the first polarizer disposed under the photographic chip and the second polarizer disposed under the biological sample to form a non-zero angle to each other to block reflected lights that the biological sample reflects illumination lights emitted by the bottom illumination light source;

wherein the ring-type fluorescent light source disposed above the biological sample on the microfluidic chip is different from the bottom illumination light source disposed under the biological sample on the microfluidic chip, and the portable ring-type fluorescence optical system for observing microfluidic channel fine-tunes a distance between the biological sample on the microfluidic chip and the objective lens, so that the fluorescent image of the biological sample on the microfluidic chip can be clearly focused on the photographic chip;

wherein the biological sample on the microfluidic chip is disposed in a replaceable microfluidic channel placement component, the portable ring-type fluorescence optical system for observing microfluidic channel further comprises a specific fine-tuning rod component, which is disposed above the photographic chip and beside to a replaceable microfluidic channel placement component and connected to the replaceable microfluidic channel placement component, the method further comprises:

finely moving the replaceable microfluidic channel placement component up and down through the specific fine-tuning rod component to change the distance from the biological sample on the microfluidic chip to the objective lens, so that the fluorescent image of the biological sample on the microfluidic chip can be clearly focused on the photographic chip;

wherein the specific fine-tuning rod component comprises an adjusting wheel and a L-shaped fine-tuning rod connected to each other; the adjusting wheel is disposed above the photographic chip; the L-shaped fine-tuning rod is disposed beside the replaceable microfluidic channel placement component and connected with the replaceable microfluidic channel placement component the method further comprises:

when the adjusting wheel is rotated, the rotated adjustment wheel pushes an end of a long side of the L-shaped fine-tuning rod to generate a long-side displacement, and a corner of the L-shaped fine-tuning rod is used as a fulcrum to convert the long-side displacement of the L-shaped fine-tuning rod into a short-side displacement to vertically push the replaceable microfluidic channel placement component to finely move up and down to fine-tune the distance from the biological sample on the microfluidic chip to the objective lens, so that the fluorescent image of the biological sample can be clearly focused on the photographic chip.

5. The method of claim 4, wherein the portable ring-type fluorescence optical system for observing microfluidic channel further comprises a specific ring-type gear component, which is connected to the objective lens, and the method further comprises steps of:

finely moving the objective lens up and down to fine-tune the distance from the objective lens to the biological sample through the specific ring-type gear component, so that the fluorescent image of the biological sample can be clearly focused on the photographic chip.

6. The method of claim 5, wherein the specific ring-type gear component comprises a ring-type gear, an adjusting wheel and a lever; the method further comprises steps of:

when the adjusting wheel is rotated, the adjusting wheel rotating the ring-type gear and the objective lens being acted by the lever and does not rotate with the ring-type gear, causing a relative distance between the ring-type gear and the objective lens to change for finely moving the objective lens up and down to fine-tune the distance from the objective lens to the biological sample, so that the fluorescent image of the biological sample can be clearly focused on the photographic chip.

* * * * *